Oct. 26, 1965    W. E. WILSON    3,214,003
AUTOMATIC SEQUENCING SELECTABLE READ OUT CONTROL FOR RANDOM
SELECTION FOR DIVERSION OF ITEMS LOCATED
ON A CONVEYOR LIVE STORAGE LOOP
Filed Nov. 27, 1961    6 Sheets-Sheet 1
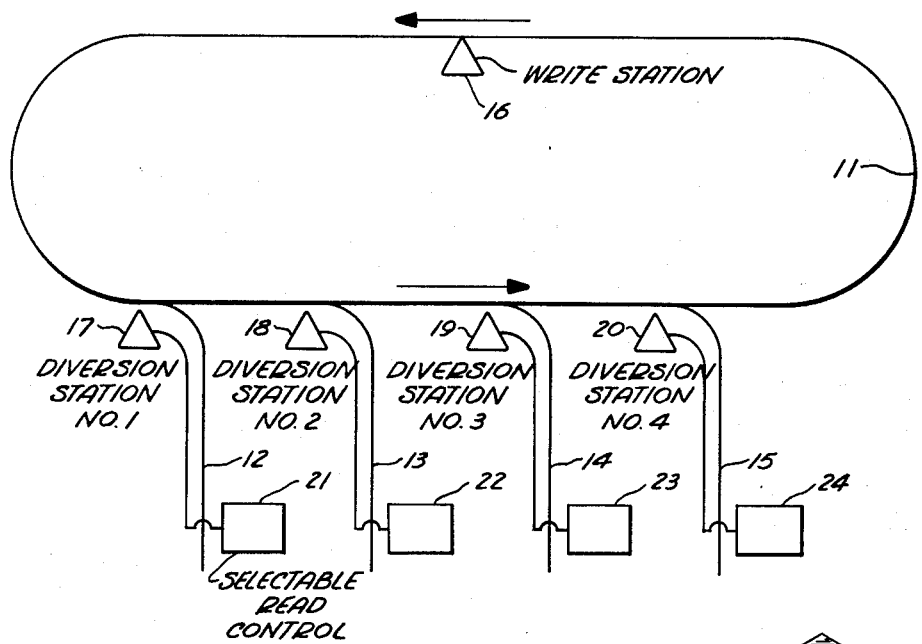
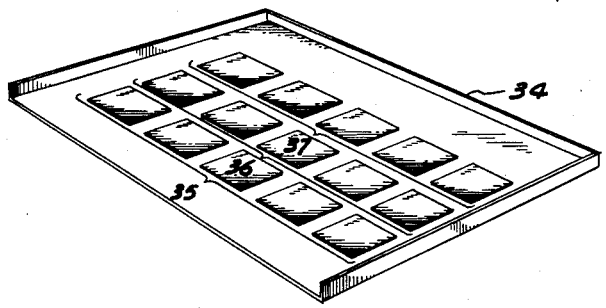
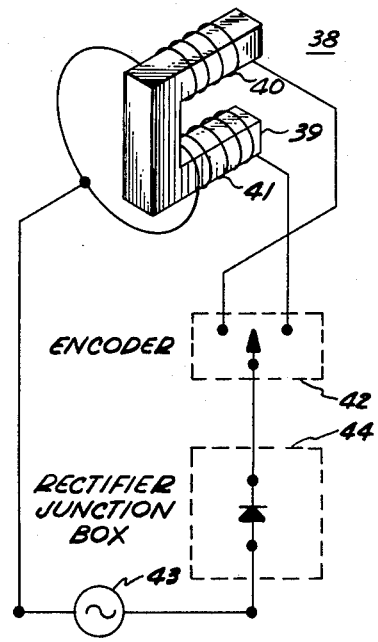
INVENTOR.
WENDELL E. WILSON
BY Everett J. Schroeder
Kenneth D. Siegfried
ATTORNEYS

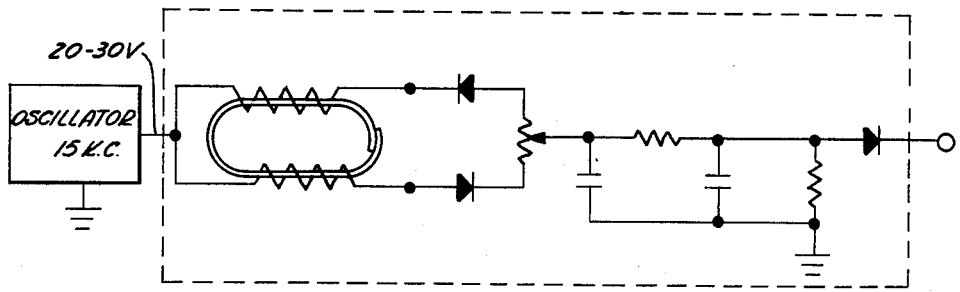
Fig. 4.
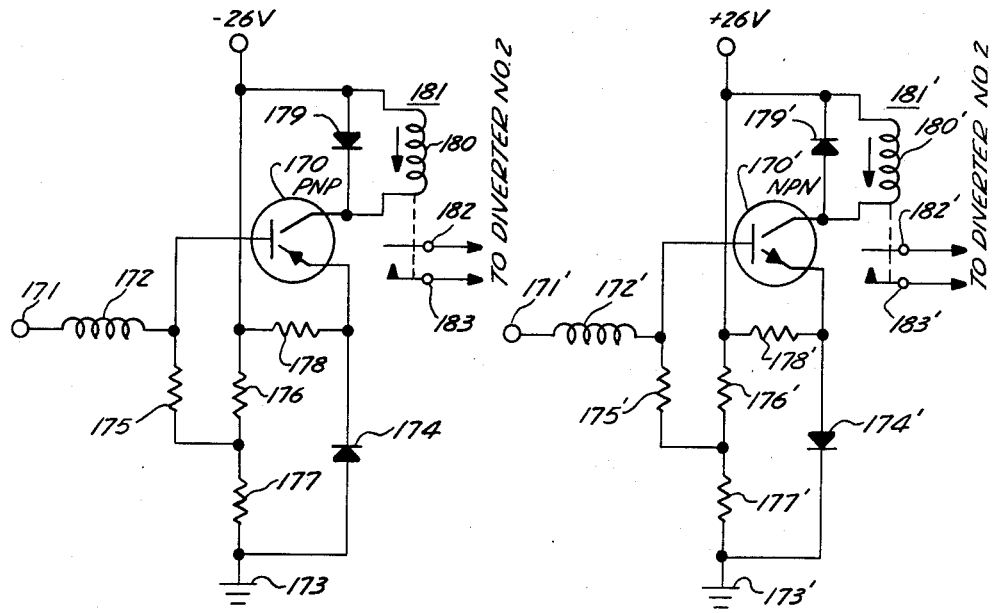
Fig. 5.
Fig. 6.

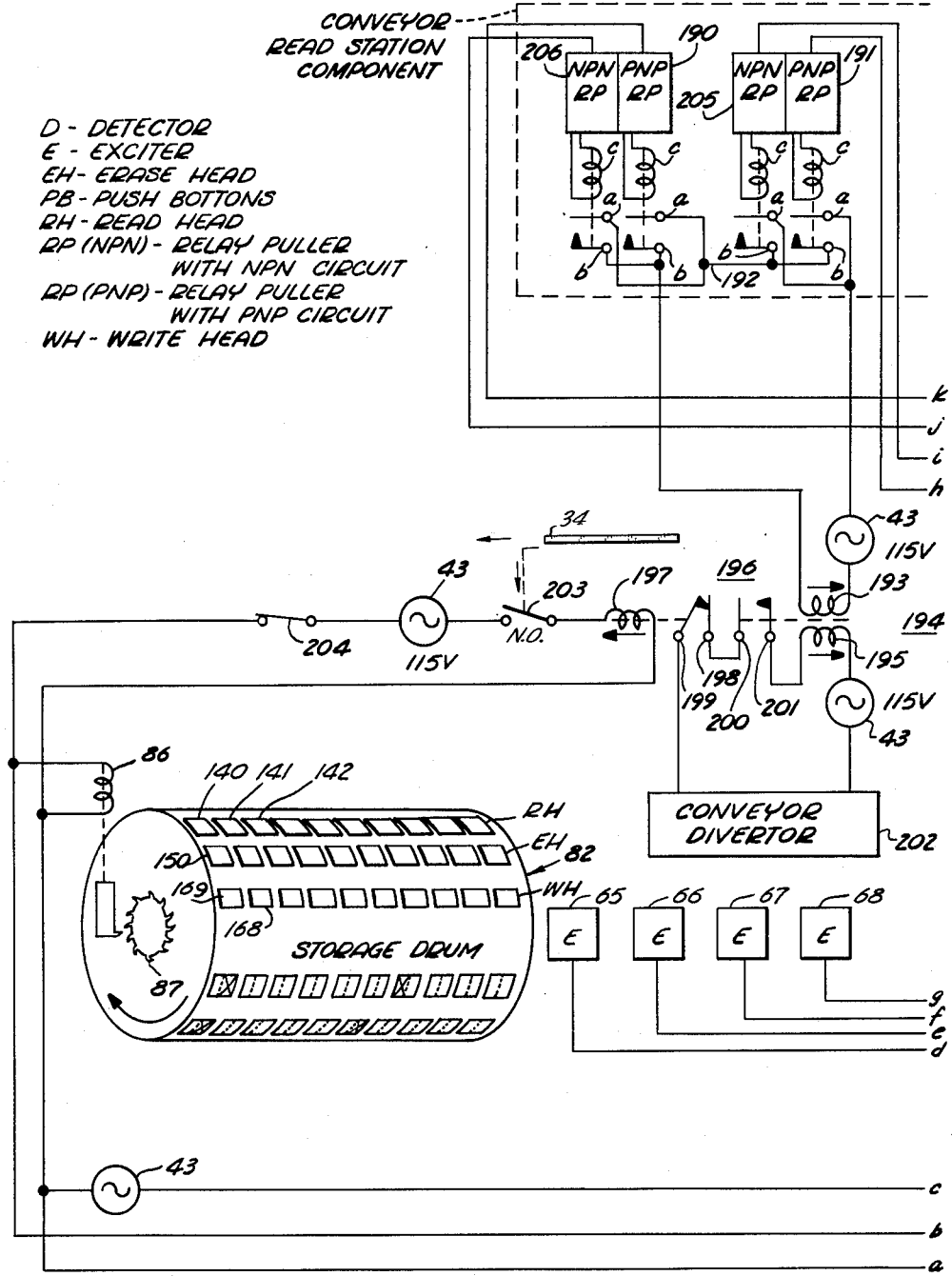

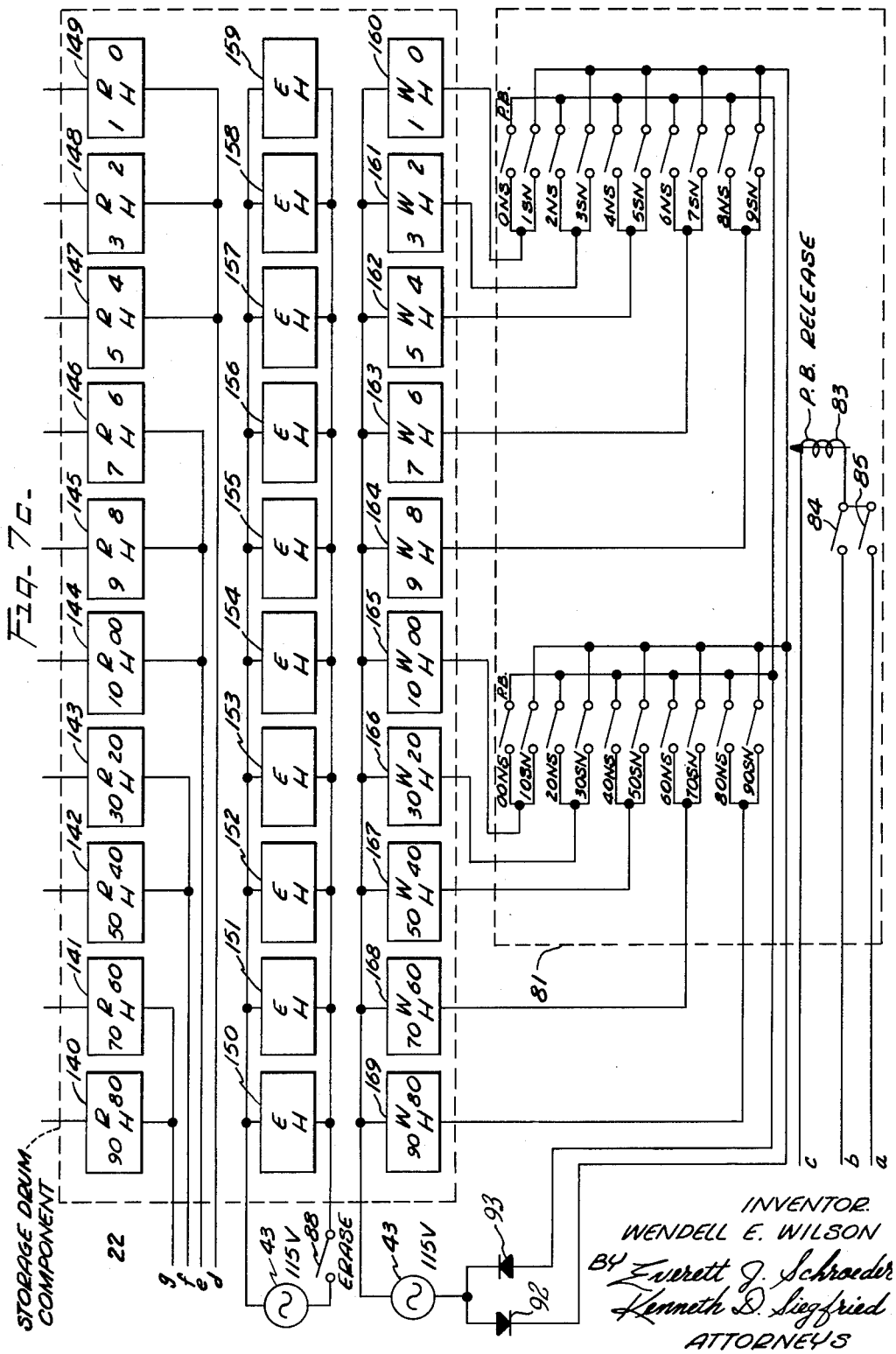

INVENTOR.
WENDELL E. WILSON

United States Patent Office  3,214,003
Patented Oct. 26, 1965

3,214,003
AUTOMATIC SEQUENCING SELECTABLE READ OUT CONTROL FOR RANDOM SELECTION FOR DIVERSION OF ITEMS LOCATED ON A CONVEYOR LIVE STORAGE LOOP
Wendell E. Wilson, Minneapolis, Minn., assignor, by mesne assignments, to Cutler-Hammer, Inc., a corporation of Delaware
Filed Nov. 27, 1961, Ser. No. 155,072
9 Claims. (Cl. 198—38)

This invention relates to the field of conveyor controls and more specifically relates to the field of automatic conveyor controls.

In the field of conveyor controls, numerous schemes and apparatus have been developed to control the destination of a particular material unit. The term "material-unit" includes any type of material, or product or quantity of materials or products which are segregated or are capable of being segregated from one another or may include dissimilar materials or products. A material unit may also comprise a quantity of loose material or granular structures such as flour, seeds, or any other such material which may be accommodated in a container or upon a belt conveyor.

Most conveying systems, regardless of the type of control applied to the movement of the material units such as magnetic, photoelectric, physical contact of the article with electrical sensing means, or any other comparable sensing means, lack the ability to remove the material units from a circulating conveyor in any given sequence. In other words, if at a particular station or location along the circulating conveyor, it is determined that a number of material units are to be removed from the conveyor, it is most difficult to remove the material units in any given sequence. Usually the first material unit approaching the diversion station, is diverted onto the secondary route and the second material unit approaching the diversion station is routed onto the secondary route. However, for certain types of order picking, or invoice control, it is desirable to remove the material units at a particular dock location or secondary route in some sequence. This sequence may be the numerical order of the last three digits of the invoice numbers for instance. With this type of control, the operator need only determine those items which are to be diverted onto the secondary conveyor from the circulating conveyor and by the use of a suitable memory system, place these numbers in the proper sequence in the memory system and allow the diverter to divert the material units in this order. Furthermore, a system in which the conveyor is controlled not only as to the sequence in which the material units are to be removed from the conveyor, but also automatically advances the memory unit so that the next material unit is diverted in a predetermined manner, requires fewer operators to operate the controls at each secondary route or dock area. In other words, by using a control system in which the material units are removed from the conveyor in a predetermined automatic sequence, the operator may take care of several dock or secondary conveyor locations.

Generally speaking, in using my control system for controlling a conveyor, the code for several of the digits of the invoices or consignments is placed upon some form of memory tabs such as magnetic material which is attached to the conveyor pilot. The pilot is a form of dummy unit or tray which carries the code tabs and precedes or carries a group of the material units. It may also be referred to as a sled in some operations. The pilot is generally used where a consignment of material units follow the pilot and when the pilot reaches a diverting station, the diverter remains in a "closed" position until all of the units have passed therefrom and until a following pilot encounters the sensing station at which time the diverter is moved back to its normal position to allow the pilot and consignment to travel on down the conveyor (assuming of course that the consignment is to go to a different location). Upon being placed upon the conveyor, the operator pushes switch buttons on a dispatch control panel corresponding to the last several digits of the consignment invoice number and when the consignment and pilot move past a "write station," a code for that particular invoice number is written on the code memory tabs. The pilot and its consignment then move down the conveyor into the storage loop after being diverted from a main or primary conveyor. When the operator at a particular loading dock or secondary conveyor wishes to withdraw the material unit in a particular sequence he first selects the invoices in the sequence that he desires and then pushes push button switches on the read station control unit corresponding to the last several digits of the invoice numbers. After all of the invoice numbers have been recorded, the operator then actuates the system and the "read station" associated with that diversion point reads the code bearing the particular invoice number and the material unit is diverted to the secondary conveyor or loading dock. Upon being deflected to the loading dock or secondary conveyor, the memory system is automatically advanced to the next desired invoice number and another material unit is diverted. This process is repeated until all of the material units bearing the invoice numbers in the proper sequence, have been withdrawn from the circulating storage loops.

It is therefore a general object of my invention to provide an improved control of conveyor systems.

It is yet another object of my invention to provide new and novel control apparatus for a conveyor to remove specific material units from the conveyor.

It is yet another object of my invention to provide sequential control of the conveyor so that material units may be removed from the conveyor in a sequence.

It is still a further object of my invention to provide improved magnetic control means to sequentially remove material units from a circulating conveyor.

It is yet another object of my invention to provide means for automatically determining which material unit is to be removed from a circulating conveyor and in which sequence.

It is still a further object of the present invention to provide automatic means using magnetic elements on magnetically recorded tracks or drums to control the sequence in which material units may be removed from a circulating conveyor.

It is still another object of the present invention to provide apparatus in which the removal of one material unit advances the memory storage unit to a position where another code can be read.

It is still another object of this invention to provide apparatus in which an automatic sequencing function is performed by comparing codes representative of the material unit to be removed, to the code of a code retaining element carried by the material unit.

It is still another object of the present invention to advance a magnetic recording drum while writing new codes into the magnetic drum.

These and other objects and advantages of my invention will more fully appear from the following description, made in connection with the accompanying drawings, wherein like reference characters refer to the same or similar parts throughout the several views, and in which:

FIG. 1 is a block diagram of a circulating conveyor system having four secondary conveyors or deck areas;

FIG. 2 shows a typical pilot tray which may be used with a roller driven conveyor, belt conveyor or other conveying means;

FIG. 3 is a schematic diagram of the write head and associated circuit;

FIG. 4 is a schematic diagram of a sensing head and its associated circuits which are excited by a high frequency oscillator;

FIG. 5 is a schematic diagram of a relay puller using a P-N-P transistor circuit;

FIG. 6 is a relay puller using an N-P-N transistor and associated circuit;

Figure 7B:
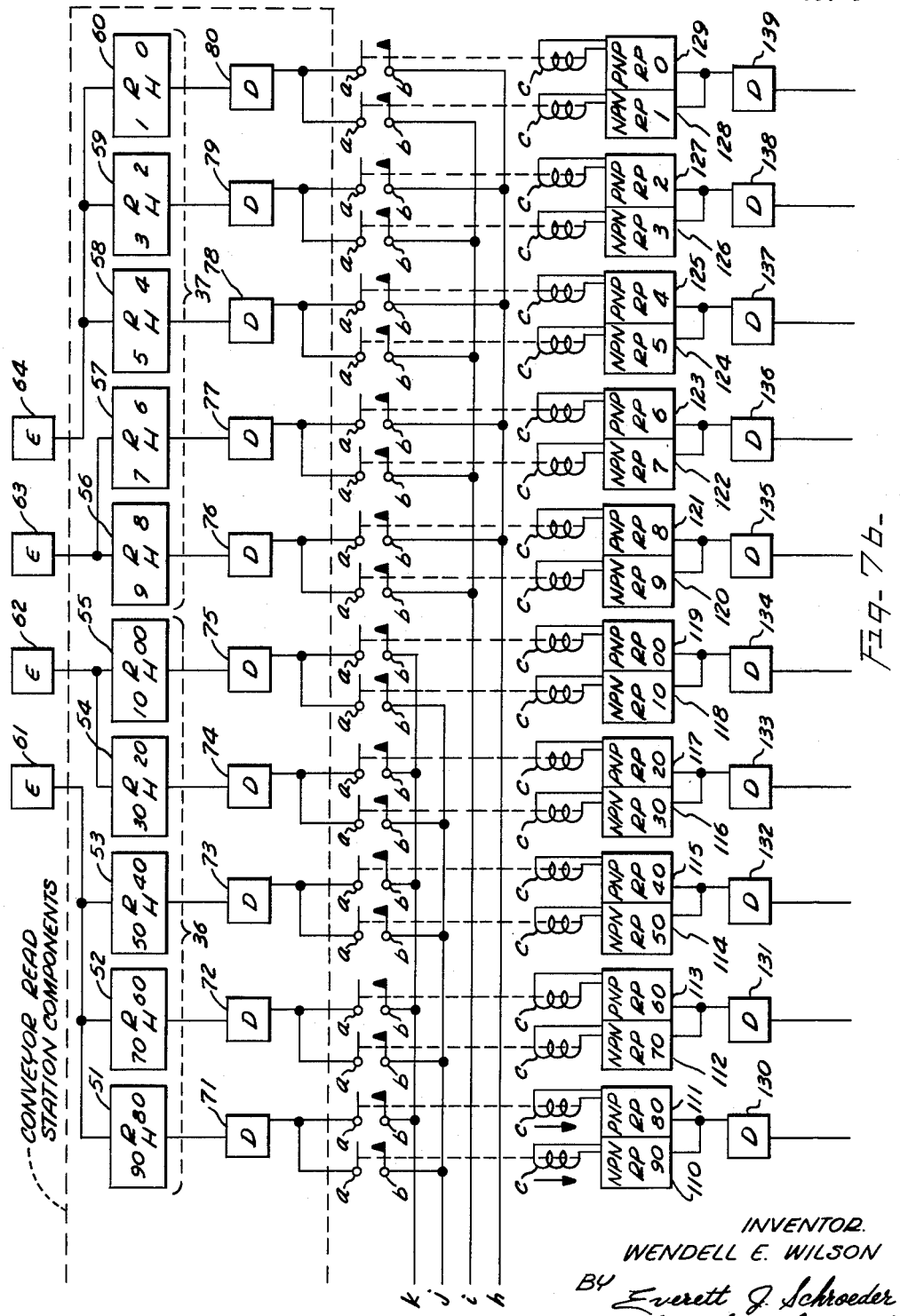
Figure 8:
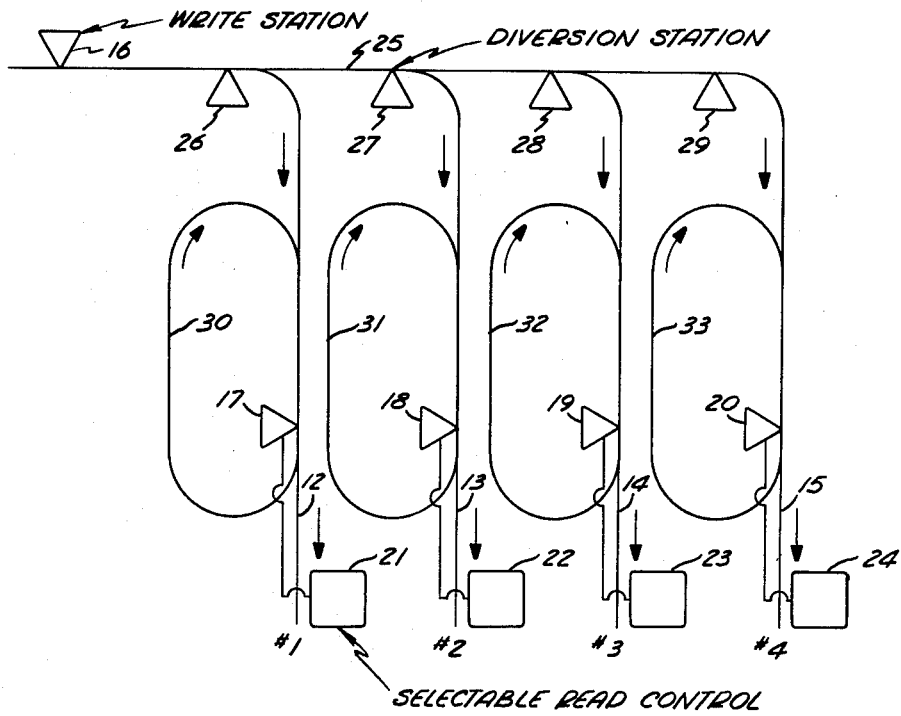

FIGS. 7a, 7b, and 7c are diagrammatic drawings of the electrical system of the automatic sequencing circuit; and FIG. 8 is a block diagram of an advanced or more complicated conveyor system utilizing circuating conveyors and automatic sequencing for removal of materal units.

FIGURE 1 shows a line diagram of a circulating conveyor 11 which has four secondary routes or dock sidings 12, 13, 14, and 15. Associated with the circulating conveyor 11, is a write station 16 for writing the code upon the code bearing elements such as small metal tabs which will receive a magnetizing code. Associated with each secondary route, is a diversion station 17, 18, 19, and 20 which is associated with each of the secondary routes 12 through 15 respectively. The diversion stations are adjacent the circulating conveyor at the point where the secondary routes leave the circulating conveyor. Associated with each secondary route is a selectable read control 21, 22, 23, and 24 which is associated with each of the secondary routes 12 through 15, respectively. Each diversion station contains the necessary components and circuits to cause the material articles to be deflected from the circulating loop conveyor onto the sidings and this will be more fully explained later.

FIG. 8 shows a slightly different arrangement for the overall conveyor system in that write station 16 is associated with a straight line conveyor 25 and from this conveyor, four diversion stations 26, 27, and 29 deflect the material units onto four circulating conveyors 30, 31, 32, and 33 respectively. It will be seen that the diversion stations 17 through 20 are associated with circulating conveyors 30 through 33 respectively so that there is only one diversion station per circulating conveyor loop. These systems are merely illustrative of the various combinations which may be used to supply the material units to the circulating conveyor and hence make use of my automatic sequencing control.

A pilot tray such as found in FIG. 2 has three rows of magnetic tabs or plates 35, 36, and 37. For this particular embodiment, there are five tabs in each row, but only 10 of the 15 tabs will be used. The tabs may be placed upon pilot tray 34 in a continuous row or in several rows and columns such as shown. The tray is usually formed of some non-metal substance such as plastic, "Fiberglas," etc., or may be formed from a nonmagnetic metal. Each of the tabs on the pilot tray is capable of receiving a magnetic code which is generally expressed as one being of a particular polarity, that is, either "N-S," or "S-N." The polarities are determined by the polarity of the magnetic recording head which records the signal upon the tab.

A typical magnetic recording or "writing" head is shown in FIG. 3 with the appropriate circuit. The write head 38 comprises an iron core 39 about which is wound a pair of coils 40 and 41, the coils being wound in such a manner that when excited separately, the magnetic flux created in the core 39 moves in opposite directions so that in one instance the code pattern N-S is created and in the other mode of operation, the code pattern S-N is created. One end of coil 40 and one end of coil 41 are connected to a pair of poles of a single pole double throw switch 42 and the other ends of coils 40 and 41 are connected to an alternating voltage source 43. The circuit is completed by connecting the switch blade of switch 42 to a diode rectifier 44 which in turn is connected in series with the alternating voltage source 43. Alternating voltage source 43 is generally equal to line magnitude and may be sixty cycles in operation. Also, the source of voltage may be a direct current source as the rectifier is used to place a pulsating voltage upon the write head to create a more intensified magnetic pattern upon the magnetic tabs, such as found in rows 35, 36, and 37 of pilot tray 34. It will, of course, be understood that there is an appropriate number of write heads such as 38 for each row of magnetic tabs and by placing the switch blade of switch 42 in the appropriate circuit, the desired code may be obtained. A further explanation of this operation will be more apparent after a more complete description of the selectable read controls such as 21, 22, 23, and 24.

Referring to FIG. 7, it will be assumed that pilot tray 34 has been placed upon a circulating conveyor such as circulating conveyor 11 and that it is desirable to withdraw a particular material unit from the circulating conveyor. In this case, the code placed upon the pilot tray will correspond to the last two digits of an invoice number such as "88." In other words, the first unit to be diverted onto a secondary route (in this case secondary route 13) bears the code number 88 and let it be assumed that the second unit to be discharged on secondary route 13 bears the code number 87. It should be quite obvious that any particular number may be chosen and the numbers may be arranged in any sequence desired. Those code detecting heads which are associated with each row of pilot tray 34 are marked with the appropriate reference and includes the five magnetic recording read heads associated with tabs and row 36 on the left, as shown in FIG. 7, and those code detecting heads associated with tabs and row 37 on the right. It should be obvious that the heads must be in confronting relation with the tabs as the pilot tray 34 moves past the recording heads, and in this case where magnetic recording means are used, the tabs should pass relatively close to the magnetic detecting head. The ten magnetic recording heads 51 through 60 are arranged to detect the magnetic code appearing in the tabs such as found on pilot tray 34. Connected to the magnetic detecting heads, 51 through 60, or as they are sometimes called "read heads," are several exciters 61 through 64. Connected to each detecting head 51 through 60 is a corresponding detector circuit 71 through 80. Exciters 61 through 64 may be any form of alternating current oscillator which provides a frequency of approximately 15 kilocycles. It will be understood, of course, that this frequency may be varied to obtain the optimum results for the circuit. FIG. 4 shows the essential elements of the detecting head, and the detector circuit. It will be seen that the magnetic detecting head is used to sense the presence of a magnetic field in proximity with the sensing head and that a pair of coils are wound around a low reluctance core. The coils are wound in such fashion that when negative and positive current pulses are conducted therethrough, magnetic flux in the same direction is produced around the core. Since the oscillator is connected to corresponding ends of both coils, and the coils are connected to oppositely poled diodes, positive and negative current pulses are passed through the coils. The magnitudes of the current pulses are made equal by the adjustment of the balance potentiometer arm and the voltage is then passed into a filter network and a load resistor. The output signal from the filter is then passed through a diode which is used to isolate a bias voltage which will be applied at the output terminal and will be explained more fully later. The important thing to be kept in mind is that when a magnetic field is brought into proximity with the magnetic detecting head and the field is oriented along the longitudinal axis of the head and coils, one of the coils will conduct more readily than the other of the coils and the pulses of current of one polarity will have a greater magnitude than the other and this signal will be applied to the filter network. Thus the voltage appearing across the load resistor will vary and this voltage may then be used to trigger some control device. For a more complete description of the magnetic code detecting heads and detector circuits, reference is made to Wales Patent 2,974,277 assigned to the same assignee. It should also be obvious that the one exciter may be used to excite several of the magnetic code detecting heads such as shown in FIG. 7. In any event, if the magnetic field detected by any of the magnetic detecting heads 51 through 60 is of the proper polarity, a control device may eventually be actuated. Such a control device will be described in more detail later. The circuits and components just described are, of course, associated with diversion station 18.

Since it is desirable to select a material unit bearing the code number 98 and draw this material unit from the circulating conveyor 11 first, and then draw material unit bearing code number 97 from the circulating conveyor secondly, the code numbers must first be established in some form of selectable code control means such as shown in block 22 of FIG. 1. A push button switch control panel 81 is shown which comprises a plurality of switches each representing a number from (0) zero through 9 and the numbers (0) zero through 90 in units of 10. These switches are shown as single pole single throw push button switches and the particular digit which each switch represents is appropriately marked opposite each switch with the particular magnetic code designation such as N-S or S-N. In like manner, similar designations are made for the other ten switches representing the code numbers 00, 10, 20, 30, 40, 50, 60, 70, 80, and 90. These push button switches also have a mechanical latching feature so that once a push button is depressed, the switch remains closed and is held in this position by the mechanical latching arrangement. The switch is designed so that once a particular number is selected, it may be changed by selection of another digit in the same switch bank. The new selection de-energizes the previous selection, but in no case can two switches in the same bank be energized simultaneously. Means will be provided for releasing the mechanical latching arrangement and this will be described more fully with reference to the sequencing circuit. All of the switch blade terminals for the even numbered single digit switches, that is zero (0), 2, 4, 6, and 8, are connected together and are connected to all of the switch blades of switches 00, 20, 40, 60, and 80. It will be noted that each of these switches uses a code "N-S." In like manner, all of the odd numbered single digit switches 1, 3, 5, 7 and 9 have their switch blades connected together and they are in turn connected to the switch blades of switches 10, 30, 50, 70, and 90. All of the latter mentioned switches are connected to terminals which produce a "S-N" code. Alternating current source 43 is connected through a properly poled diode 92, to all of the switch arms bearing the code "S-N" and is connected to an oppositely poled diode 83 to all of the switches which are to produce the code "N-S." The other unconnected terminals of switches zero (0) and 1 are connected together and are further connected to a magnetic recording write head 160. The circuit is completed by connecting write head 160 to alternating voltage source 43. It will be noted that if switch number zero (0) is depressed that the circuit to write head 160 is completed through diode 93 to produce a "N-S" code and if switch number 1 is used to complete the circuit to write head 160, current passing through diode 92, being of opposite polarity, produces a signal so that a "S-N" code is produced at the write head. In a similar manner, switches 3 and 4 have their two terminals connected to a write head 161 and the circuit is completed to alternating voltage source 43 by a connecting lead which connects the other end of the write head coils.

Again, if push button switch number 2 is depressed a "N-S" code will be produced by write head 161 and if switch button number 3 is depressed a "S-N" code will be produced. In a similar manner, switches 4 and 5 are connected to a write head 162, switches 6 and 7 are connected to a write head 163, and switches 8 and 9 are connected to a write head 164.

Switches 00 and 10 have their terminals connected to a write head 165, switches 20 and 30 have their terminals connected to a write head 166, switches 40 and 50 have their terminals connected to a write head 167, switches 60 and 70 have their terminals connected to a write head 168, and switches 80 and 90 have their terminals connected to a write head 169. In a manner similar to the connections for write heads 160 through 164, write heads 165 through 169 have their other coil connections all connected together at alternating voltage source 43. If switch arm 00 is depressed, voltage is applied to write head 165 from diode 93 to produce a "N-S" code and if switch arm 10 is depressed, the voltage is taken from diode 92 and the signal is sent to write head 165 to produce a "S-N" code.

Since it is obvious that write heads 160 through 169 must impress their code upon some magnetizable material, other metal tabs or elements may be used, or some other magnetizable material such as recording tape or a film of material capable of retaining a magnetic code may be used to retain the code. These elements or materials are placed upon a storage drum 82 and are rotated with the storage drum. It is necessary to determine ahead of time the maximum number of units or material units which one would want to select in a particular order or sequence at any one time. For purpose of illustration, I have chosen a drum in which the maximum number of units to be removed from the circulating conveyor sequence are 12, and therefore, there should be 12 rows of magnetic elements or magnetizable material placed upon storage drum 82. Storage drum 82 is adapted to revolve in cooperating relation with the magnetic recording and detecting apparatus and erase apparatus which will be explained later. It can be seen that by depressing switch number 8 and switch number 80, the code 88 will be magnetically impressed upon the magnetizable material and this is seen generally by the tabs or magnetizable areas which are marked with an "X." Once the switches 8 and 80 have been depressed and the code written upon the magnetizable material, the next desirable result is to rotate the storage drum and release the switches so that the next sequence may be written upon the storage drum. A push button release solenoid 83 is mechanically connected to the latch assembly which latches the push buttons in their energized position and one terminal of the coil for solenoid 83 is connected to alternating voltage source 43 or some other suitable voltage source and the other end of the coil forming solenoid 83 is connected to a terminal of a single pole single throw switch 84, and is also connected to a terminal of a single pole single throw switch 85. In other words, the two terminals of switches 84 and 85 are connected together. The switch blade terminal of switch 84 is connected to a coil 86 of a stepping switch and ratchet 87. The ratchet is connected to storage drum 82 so that when coil 86 of stepping switch and ratchet 87 is energized, the drum is rotated so that the magnetizable areas are moved a distance equal to the circumferential distance separating the magnetic areas. That is, the tabs or magnetic tracks or magnetizable areas are rotated so that after one code is written, another code may be written on the next appearing magnetizable area. Coil 86 has its other terminal connected to the other side of alternating voltage source 43 to complete the circuit. Thus, when the switch arm of switch 84 is closed, the sequencing relay or stepping switch is placed in series with the push button release solenoid so that both coils are energized simultaneously, thus releasing switch arms 90 and 8, and at the same time advancing storage drum 82 to the next row of magnetizable elements. If for some reason it should be desirable to release any of the switches labeled 00 through 90 or zero through 9 without advancing the storage drum, switch 85 may be utilized where the switch arm closes the circuit between push button release coil 83 and alternating voltage source 43 so that a circuit is completed to release the push button switches without advancing the storage drum. In this latter mode of operation, it will be noted that the push button release solenoid coil is the only one connected to the voltage source 43. Once the storage drum has been advanced to the next row of magnetizable material, switch 80 and switch 7 are depressed to write the code 87 onto the storage drum and upon depressing the switch arm of switch 84, the drum is again advanced to the next row of magnetizable maerial and the push button release solenoid releases the push button switches which had been pressed to write the code.

Since the magnetizable areas on the storage drum should be erased during each operation, it is necessary to erase all of the codes on the magnetizable areas after passing underneath the read head arrays. This is accomplished by energizing a plurality of erase heads 150 to 159 by an alternating voltage source such as alternating voltage source 43. Erase heads 150 to 159 are all identical to each other and are connected in parallel across the alternating voltage line where a switch 88 is in series with the alternating voltage source to control the period when the erase function will be performed. Erase heads 150 through 159 can be made in the same configuration as the write or recording head 38 shown in FIG. 3, except that an alternating voltage source is applied to one of the coils so that the flux path through core 39 is alternately changed and therefore effectively wipes out any code existing upon the magnetizable material on storage drum 82.

In order to read the codes just impressed upon the magnetizable material on the storage drum 82, it is necessary the magnetizable areas on drum 82. This is accomplished with a plurality of read heads or sensing means 140 through 149 in which the heads are placed in close proximity to the magnetic coded areas of the magnetizable material. Read heads 147, 148 and 149 are excited by an exciter 65 and read heads 144, 145, and 146 are excited by an exciter 66. Read heads 142 and 143 are excited by an exciter 67 and read heads 140 and 141 are excited by an exciter 68. Exciters 65 through 68 are identical to exciters 61 through 64 and are further explained in the afore referenced patent. The magnetic code sensing heads 140 through 149 are each connected to a detector circuit 130 through 139 respectively. Detectors 130 through 139 are identical to detectors 71 through 80 as explained earlier in the specification.

A plurality of relay pullers 110 through 129 are connected to detectors 130 through 139, it being understood that a pair of relay pullers are connected to each detector. That is, relay pullers 110 and 111 are connected to detector 130 and relay pullers 112 and 113 are connected to detector 131, etc. It will also be noted that all relay pullers designated as an even number, that is, 110, 112, 114, 116, 118, 120, 122, 124, 126, and 128 are all of the type designated "NPN" and all relay pullers designated with an odd reference numeral, that is 111, 113, 115, 117, 119, 121, 123, 125, 127, and 129 are all of the PNP type.

For a better understanding of the two different types of relay pullers, reference is made to FIGS. 5 and 6. In FIG. 5, a transistor 170 of the PNP type has its base connected to an input terminal 171 through a choke coil 172 and has its emitter connected to ground 173 through a diode 174. Also connected to the base of transistor 170 is a resistor 175 and the other end of the resistor is connected to a junction of a voltage divider formed by a pair of series connected resistors 176 and 177, which in turn are connected between ground 173 and a negative voltage source which for this particular case is −26 volts. Also connected between the negative voltage source and the emitter of the transistor is a resistor 178. Connected between the collector of the transistor 170 and the negative voltage source is a diode 179 and connected across the diode in parallel manner is a relay coil 180 of a relay 181. Relay 181 has a pair of contacts 182 and 183 which are connected to the output of the relay puller or control device. The relay puller is designed to operate upon receiving a voltage pulse of a particular polarity, the transister normally being biased so as not to conduct any current, and upon receiving the inupt pulse and overcoming the bias, voltage of a sufficient magnitude is applied to coil 180 of relay 181 to cause contacts 182 and 183 to be engaged.

FIG. 6 shows a relay puller which is similar to that of FIG. 5 except that transistor 170' is of the NPN type and of course reacts to a bias from a positive voltage source such as a +26 voltage source rather than the negative 26 voltage source as found in FIG. 5. Using this type of relay puller, a signal of the opposite polarity to that used to energize the relay puller in FIG. 5 is used to energize the relay puller of FIG. 6 and thus when both are connected to the output of the detector circuit will allow one or the other relay puller to close relay contacts 182 and 183 or 182' and 183' depending upon the particular code which the sensing head detected.

For simplicity in explaining the operation of the circuit, relay contacts 182 and 183 will be designated "a" and "b" respectively of the particular referenced relay puller and coil 180 will be designated as "c" for each of the relay pullers. Returning again to the read heads 140 and 145, it will be seen that read head 140 will detect the code "80" and read head 146 will detect the code "8." Upon the signal passing from read head 140 to detector 130, the signal will then be applied to both the NPN relay puller 110 and the PNP relay puller 111. The signal appearing on detector 130 will be of the proper phase relationship to cause PNP puller 111 to be energized and thereby close relay contacts 111a and 111b.

Returning again to detector 71, code detecting read head 51 will supply a signal to detector 71 which in turn supplies voltages to relay contacts 110a and 111a. Since relay coil 110c is not energized, relay contacts 110a and 110b are not brought together and therefore the signal is not passed on. However, the signal appearing on relay contact 111a is connected to contact 111b since coil 111c is energized due to the signal appearing on detector 130, and the signal from detector 71 is then applied to another relay puller 190 of the PNP type.

Read head 145 will detect the presence of a code on the magnetizable code area of storage drum 82 and supplies a signal to detector 135 which in turn provides an output signal to PNP relay puller 121 and NPN relay puller 120. The signals from detector 135 overcome the bias on PNP relay puller 121 and energize coil 121c to cause contacts 121a and 121b to be engaged. Since read heads 56 detected a code which in turn produced an output signal on detector 76, a signal is then applied to relay puller contacts 120a and 121a. Since relay contact 120a is not connected to any further terminal, the signal appears in an open circuit, but the signal which appears on relay terminal 121a is connected to 121b and is applied to another PNP relay puller 191. Relay pullers 190 and 191 are located in the area adjacent to diversion station 18. Relay puller 191 is also identical to the PNP relay puller found in FIG. 5. Relay pullers 190 and 191, upon being energized have their relay contacts "a" and "b" interconnected and relay contact "a" of PNP relay puller 190 is connected to relay contact "b" of PNP relay puller 191 through a connecting lead 192. Terminal "a" of relay puller 191 is connected to an alternating voltage source such as alternating voltage source 43 and contact "b" of relay puller 190 is connected to a coil 193 at one terminal and the other terminal of coil 193 is connected to voltage source 43. In other words, when contacts "a" and "b" are engaged in each of relays 190 and 191, voltage is applied from voltage source 43 to coil 193 of a contactor relay 194. Contactor relay 194 has a holding coil 195 which also engages the armature of contactor relay 194.

A diverter control relay 196 has a coil 197 and a pair of contacts 198 and 199 that are normally closed. Contactor relay 194 has a pair of contacts 200 and 201 that are normally open and contact 198 is connected to contact 200 and 201 is connected to coil 195 with the other terminal of holding coil 195 being connected to alternating voltage source 43. To complete the circuit, a conveyor diverter 202 is connected to alternating voltage source 43 and to contact 199. Therefore, upon relay contact 200 and 201 being engaged, a circuit is formed through coil 195, alternating voltage source 43, conveyor diverter 202, and relay terminals 199 and 198 to complete the circuit since terminals 198 and 200 are connected together. Since coil 195 is now in series with the current flowing through the conveyor diverter, the holding coil keeps relay contacts 200 and 201 engaged. Thus, as the material unit passes by read heads 51 and 56, and storage drum 82 is rotated so that read heads 140 and 145 detect a code, contactor relay 194 is energized and will remain energized after pilot tray 34 passes by read heads 51 through 60. At this point, material units associated with pilot tray 34 are on the secondary route 13 and are moving away from the live circulating storage conveyor.

Diverter control relay coil 197 has one terminal connected to one terminal of coil 86, and has its other terminal connected to a shoe switch 203 or some other suitable sensing means to tell when pilot tray 34 has passed thereby. The shoe switch is usually tripped or urged into an energized position by the material unit or pilot tray as it passes over the shoe switch on the conveyor. The other terminal of shoe switch 203 is connected to alternating voltage source 43. To complete the circuit, the other terminal of alternating voltage source 43. To complete the circuit, the other terminal of alternating voltage source 43 is connected to another switch 204 which is normally open when push button switches 81 are being depressed to write the code into the magnetizable material on drum 82. Switch 204 is used as a safeguard while writing the codes onto the magnetizable material and for some applications it may be desirable to use a double pole switch to break the circuit to coil 197, thereby deactivating conveyor diverter 202. After the magnetic codes have been written into drum 82, switch 204 is closed and the other terminal of switch 204 is connected to the other terminal of coil 86 so that the circuit is complete to stepping switch coil 86. Upon pilot tray 34 or the material unit passing over shoe switch 203, diverter control relay coil 197 is energized as well as stepping switch coil 86, so that storage drum 82 is advanced to the next magnetizable area. Since the diverter control relay contacts 198 and 199 are no longer engaged, holding relay coil 195 loses its energization and allows contacts 200 and 201 to be de-energized thus de-energizing conveyor diverter 202. Since storage drum 82 has been advanced, the next code on storage drum 82 is in a position to be read by magnetic code sensing heads or read 140 through 149 and if the code detected by the read heads is the same code as that detected by code read heads 51 through 60, the two codes are then compared, in what might be called a comparison apparatus through the use of the relay pullers associated with the drum read heads and detector circuits, and the appropriate station relay pullers. Assuming that the next magnetizable area upon storage drum 82 contains a code representative of numeral 97, and that the next code appearing upon pilot tray 34 happens to be 96 instead of 97, it will be seen that this material unit or pilot tray is not deflected from the circulating conveyor. Since the code detected by read head 146 produces a signal which passes from detector 136 to NPN relay puller 122, relay contacts 122a and b will be closed. At this point, it is well to review the operation of the relay pullers shown in FIGS. 5 and 6. Since the PNP relay puller has a negative bias applied to transistor 170, it will be seen that a positive going pulse is needed to overcome the bias and cause the relay contacts to be engaged. In like manner, since the NPN relay puller is biased with a positive voltage, it will require a negative going pulse to overcome the bias and cause the relay to be energized. Keeping this in mind, the code read by read head 57 produces a positive going pulse and the positive going pulse appears on both of the conductors leaving detector 77 so that a positive going pulse is applied to relay contacts 122a and 123a. Because relay 123 of PNP relay puller 123 is not energized, this signal appears in an open circuit. However, since relay contacts 122a and 122b are engaged, the signal then passes from relay contact 122b to a relay puller 205 which is an NPN relay puller. Because the NPN relay puller is biased positively, the positive voltage appearing on the NPN relay puller 205 will only increase the bias and therefore keep the relay puller in a non-operative position. Another relay puller 206 of the NPN type is connected to NPN relay puller 110, 112, 114, 116, and 118. These relay pullers are affected by signals representative of code numbers 100, 80, 60, 40 and 20 in the manner just described.

Assuming now that a material unit bearing the code number 87 is detected by code detecting means 51 through 60, it will be seen that a negative going pulse is applied to NPN relay puller 122 at contact "a" and since the code detected on storage drum 82 is also "7" as detected by read head 146, the negative going pulse as applied to NPN relay puller 205, overcomes the bias on the NPN relay puller to close contacts "a" and "b" of the NPN relay puller 205. In like manner, a positive going pulse is detected from read head 51 and passes to detector 71 where the positive signal is applied to contact "a" of relay pullers 110 and 111. Since read head 140 detects the code representative of number 80, PNP relay puller 111 is energized and the signal developed by detector 71 is applied to relay puller 190 since contacts "a" and "b" are engaged at PNP relay puller 111. Thus PNP relay puller 190 has its contacts engaged and the circuit is thereby completed to again energize the conveyor diverter. It should also be recognized that the components described, and the circuits connected thereto for selectable read control 22 and diversion station 18, comprise the same components and circuits for diversion stations 17, 19, and 20 and selectable read controls 21, 23 and 24. It should also be kept in mind that if four digits are to be used to identify the different material units, that it is only necessary to add the additional components and circuits such as found in FIG. 7 to increase the capabilities of handling a larger number of material units.

*Operation*

In operation, the first step which must be performed is to code the memory tab or magnetizable material unit associated with the material unit and for this particular embodiment, the last two digits of an invoice number are placed upon the magnetic tabs by encoding the proper code number with the proper number of write heads such as found in FIG. 3. The material units are then placed in motion upon the conveyor and may be diverted to the circulating conveyor or started on the circulating conveyor. Since switch 88 was closed connecting alternating voltage source 43 to each of the erase heads 150 through 159, during the time when the last sequence operation took place, all of the previous codes were erased as the drum was advanced to each new position. Switch 204 is placed in its open circuit condition and push button switches 81 are then depressed according to the last two numbers of the invoice, the numbers corresponding to the material unit bearing the last two invoice numbers. This code is placed upon the magnetizable material carried by storage drum 82 and after each two digit number is selected from push button switches 81, switch 84 is depressed to advance the storage drum to the next row of magnetizable material and release the mechanical latching mechanism associated with the push button switches. Once the total number of units and in the proper sequence have been selected, the storage drum is then in a condition for the read heads 140 through 149 to sense the magnetic code impressed thereon, and energize the appropriate relay puller. Switch 204 is then closed. If the signals representative of the code detected on the material unit by sensing heads 51 through 60 is the same as the code detected by heads 140 to 149, then the appropriate relay pullers 206 or 190 and 205 or 191 are energized so that the series connected contacts are energized completing the circuit to the contactor relay 194. Contactor relay 194 completes the circuit to conveyor diverter 202 and thus diverts the material unit from the circulating conveyor onto the secondary conveyor or dock area associated therewith. Once the material unit is diverted, either the diverter or the material unit may actuate the stepping switch 203 for the storage drum to advance storage drum 82 to the next row of magnetizable materials and thus condition read heads 140 through 149 to select the next code representative of the last two digits of the invoice associated with a particular material unit. Since the read head is now set to read a new code, relay pullers 206 or 190 and 205 or 191 become de-energized but conveyor diverter 202 will remain in its energized position because of holding coil 195. Upon the material unit passing over the shoe switch 203, diverter control relay 196 is actuated to break the circuit to the conveyor diverter 202 and the diverter is returned to its normal position. The circuit is now in a position to divert the next material unit bearing the code which is set into storage drum 82. This sequence is repeated until all of the units have been diverted from the circulating conveyor and the sequence has been completed as set into the storage drum 82.

It will, of course, be understood that various changes may be made in the form, details, arrangement, and proportions of the parts without departing from the scope of my invention which consists of the matter shown and described herein and set forth in the appended claims.

I claim:

1. Conveyor control apparatus for controlling the movement of material units comprising: a live storage circulating conveyer for moving material units having at least one diversion station and at least one secondary route constructed and arranged to be engaged by said circulating conveyor at said diversion station; code retaining elements associated with each material unit bearing a code representative of that material unit and being supported by said live storage circulating conveyor; first code detecting means located at each of said diversion stations for detecting the code retained by said code retaining elements including means for producing output signals representative of said code; second code retaining elements retaining a code corresponding to certain of said material units; second code detecting means cooperating with certain of said second code retaining elements for detecting said code retained thereby and producing signals representative thereof; code comparison means energized by said signals from said first and second code detecting means to supply an output signal when said signals are representative of the same code; and diverter means located at each of said diversion stations and responsive to said output signal from said code comparison means, said diverter means constructed and arranged to engage said secondary route and said live storage conveyor so that said certain material units are diverted onto said secondary route.

2. Conveyor control apparatus for controlling the movement of material units comprising: a live storage circulating conveyer for moving material units having at least one diversion station and at least one secondary route constructed and arranged to be engaged by said circulating conveyor at said diversion station; code retaining elements associated with each material unit bearing a code representative of that material unit and being supported by said live storage circulating conveyor; first code detecting means located at each of said diversion stations for detecting the code retained by said code retaining elements including means for producing output signals representative of said code; second code retaining elements retaining a code corresponding to certain of said material units; second code detecting means cooperating with certain of said second code retaining elements for detecting said code retained thereby and producing signals representative thereof; code comparison means energized by said signals from said first and second code detecting means to supply an output signal when said signals are representative of the same code; diverter means located at each of said diversion stations and responsive to said output signal from said code comparison means, said diverter means constructed and arranged to engage said secondary route and said live storage conveyor so that said certain material units are diverted onto said secondary route; and actuatable moving means for causing movement of said second code sensing means relative to said second code retaining elements, said actuatable moving means being actuated by said diverter means to cause said second code detecting means to sense certain others of said second code retaining elements.

3. Conveyor control apparatus for controlling the movement of material units comprising: a live storage circulating conveyor for moving material units having a plurality of diversion stations and a plurality of secondary routes constructed and arranged to be engaged by said circulating conveyor at said diversion stations; magnetizable elements associated with each material unit bearing a code representative of that material unit and being supported by said live storage circulating conveyor; first magnetic code detecting means located at each of said plurality of diversion stations for detecting the code retained by said magnetizable elements including means for producing output signals representative of said code; second magnetizable elements retaining a code corresponding to certain of said material units; second magnetic code detecting means cooperating with certain codes of said second magnetizable elements for detecting said code retained thereby and producing signals representative thereof; code comparison means energized by said signals from said first and second magnetic code detecting means to supply an output signal when said signals are representative of the same code; diverter means located at each of said diversion stations and responsive to said output signal from said code comparison means, said diverter means constructed and arranged to engage said secondary routes and said live storage conveyor so that said certain material units are diverted onto said secondary routes; and actuatable moving means for causing movement of said second code sensing means relative to said second magnetic code retaining elements, said actuatable moving means being actuated by said diverter means to cause said second magnetic code detecting means to be moved with respect to, and sense certain others of, said second magnetizable elements.

4. Conveyor control apparatus for controlling the movement of material units comprising: a live storage circulating conveyor for moving material units having a plurality of diversion stations and a plurality of secondary routes constructed and arranged to be engaged by said circulating conveyor at said diversion stations; magnetizable material associated with each material unit bearing a code representative of that material unit and being supported by said live storage circulating conveyor; first magnetic code detecting means located at each of said plurality of diversion stations for detecting the code retained by said magnetizable material including means for producing output signals representative of said code; a drum pivotally supported for rotation and having its surface covered with a second magnetizable material retaining a code corresponding to certain of said material units; second magnetic code detecting means cooperating with certain codes of said second magnetizable material for detecting said code retained thereby and producing signals representative thereof; code comparison means energized by said signals from said first and second magnetic code detecting means to supply an output signal when said signals are representative of the same code; diverter means located at each of said diversion stations and responsive to said output signal from said code comparison means, said diverter means constructed and arranged to engage said secondary routes and said live storage conveyor so that said certain material units are diverted onto said secondary routes; and engageable rotating means for rotating said drum, said engageable rotating means being actuated by said material units diverted by said diverter means to cause said drum to be moved with respect to said codes of said second magnetizable material.

5. Conveyor control apparatus for controlling the movement of material units comprising: a live storage circulating conveyer for moving material units having at least one diversion station and at least one secondary route constructed and arranged to be engaged by said circulating conveyor at said diversion station; code retaining elements associated with each material unit and being supported by said live storage circulating conveyor; encoding means for encoding said code retaining elements to retain a code representative of that material unit; code detecting means located at each diversion station for detecting the code retained by said code retaining elements including means for producing output signals representative of said code; selectable code control means connected to said code detecting means to receive said output signals therefrom, said selectable code control means including means for selecting codes representative of certain material units to be selected from said circulating conveyor and for transmitting said output signals representative of said codes therefrom; diverter means located at said diversion station operably conncted to said selectable code control means, said diverter means constructed and arranged to engage said secondary route and said live storage conveyor so that said certain material units are diverted onto said secondary route; and code changing means actuated by said diverter means and connected to said selectable code control means for actuation thereof, to select a different predetermined code representative of a different material unit to be removed from said circulating conveyor.

6. Conveyor control apparatus for controlling the movement of material units comprising: a live storage circulating conveyor for moving material units having a plurality of diversion stations and a plurailty of secondary routes constructed and arranged to be engaged by said circulating conveyor at said diversion stations; code retaining elements associated with each material unit bearing a code representative of that material unit and being supported by said live storage circulating conveyor; code detecting means located at each of said plurality of diversion stations for detecting the code retained by said code retaining elements including means for producing output signals representative of said code; a selectable code control means connected to each of said code detecting means for receiving said output signals therefrom, each selectable code control means having means for selecting predetermined codes representative of certain material units to be selected from said circulating conveyor; a diverter means located at each of said diversion stations and responsive to the signals passing from said selectable code control means, said diverter means constructed and arranged to engage said secondary routes and said live storage conveyor so that certain material units are diverted onto said secondary routes; and code changing means actuated by said diverter means and connected to said selectable code control means for actuating said selectable code control means to select a different predetermined code representative of a different material unit to be removed from said circulating conveyor.

7. Conveyor control apparatus for controlling the movement of material units comprising: a live storage circulating conveyor for moving material units having a plurality of diversion stations and a plurality of secondary routes constructed and arranged to be engaged by said circulating conveyor at said diversion stations; first code retaining elements associated with each material unit; first encoding means for encoding said first code retaining elements to retain a code representative of that material unit; first code detecting means located at each of said plurality of diversion stations for detecting the code retained by said first code retaining elements including means for producing output signals representative of said first code, second code retaining elements associated with each diversion station for retaining second predetermined codes representative of certain material units to be selected from said circulating conveyor; second encoding means for encoding said second code retaining elements in accordance with said second predetermined code; second code detecting means located in cooperating relation with said second code retaining elements for detecting said second codes including means for producing output signals representative of said code detected; engagable connecting means having a control input responsive to said signals from said second code detecting means and having a signal input from said first code detecting means for producing output signals when said input signals coincide; a diverter means located at each of said diversion stations responsive to the output signals from said engagable connecting means, said diverter means constructed and arranged to engage said secondary routes and said live storage conveyors so that said certain material units are diverted onto said secondary routes; and means actuated by said certain material units for bringing into communication with said second code detecting means different code retaining elements so that all code retaining elements eventually cooperate with said second code detecting means until all material units have been removed from said circulating conveyor in a predetermined sequence.

8. Conveyor control apparatus for controlling the movement of material units comprising: a primary conveyor for moving material units having a plurality of first diversion stations and a plurality of live storage circulating conveyors, each constructed and arranged to be engaged by said primary conveyor at said first diversion stations; code retaining elements associated with each material unit bearing a code representative of that material unit and being supported by said primary conveyor; first code detecting means located at each of said plurality of first diversion stations for detecting a distinct code retained by said code retaining elements and including means for producing output signals representative of said code; a first diverter means located at each of said first diversion stations responsive to said output signals received from said first code detecting means for diverting from said primary conveyor to said circulating conveyor at said first diversion station, each material unit associated with each distinct code detected; at least one conveyor secondary route, each having a second diversion station associated therewith and constructed and arranged to be engaged by said circulating conveyor; a second code detecting means located at said second diversion station for detecting the code retained by said code retaining elements including means for producing output signals representative of said code; a selectable code control means associated with each of said second code detecting means for receiving said output signals therefrom, each selectable code control means having means for selecting predetermined codes representative of certain material units to be selected from said circulating conveyor, and having means allowing only certain of said signals from said second code detecting means to pass therefrom; a second diverter means associated with each of said selectable code control means and responsive to the signals passing from said selectable code control means, said second diverter means constructed and arranged to engage said secondary route and said live storage conveyor so that said certain material units are diverted onto said secondary route; and code changing means actuated by said second diverter means and connected to said selectable code control means for actuating said selectable code control means, to select a different predetermined code representative of a different material unit to be removed from said circulating conveyor.

9. In conveyor control apparatus for selectively controlling the movement of code bearing material units to be removed at a diversion station, the apparatus at each diversion station comprising: a code storage means having a code stored therein corresponding to certain of the material units; a code reading means cooperating with said code storage means for reading that portion of said code stored therein representative of certain of the material units and producing signals representative thereof; and code storage means for reading that portion of said code means for changing the code to be read by said code reading means when the code detected by said code reading means is the same as the code borne by the material unit.

References Cited by the Examiner

UNITED STATES PATENTS

| | | | |
|---|---|---|---|
| 1,825,037 | 9/31 | Anderson | 198—38 |
| 2,628,572 | 2/53 | Le Goff | 104—88 |
| 2,877,718 | 3/59 | Mittag | |
| 2,923,420 | 2/60 | Dyer et al. | 214—11 |
| 2,974,277 | 3/61 | Wales. | |
| 2,986,264 | 5/61 | Holben | 198—38 |
| 3,074,353 | 1/63 | Davonshire et al | |
| 3,075,653 | 1/63 | Wales et al. | |

SAMUEL F. COLEMAN, *Primary Examiner.*

WILLIAM B. LA BORDE, *Examiner.*